US009212872B2

United States Patent
Tamir et al.

(10) Patent No.: US 9,212,872 B2
(45) Date of Patent: Dec. 15, 2015

(54) THREAT SIMULATING SYSTEM

(71) Applicant: ISRAEL MILITARY INDUSTRIES LTD., Ramat Hasharon (IL)

(72) Inventors: Gabriel Tamir, Kfar Sava (IL); Hagai Perkal, Givat Shmuel (IL)

(73) Assignee: ISRAEL MILITARY INDUSTRIES LTD., Ramat Hasharon (IL)

( * ) Notice: Subject to any disclaimer, the term of this patent is extended or adjusted under 35 U.S.C. 154(b) by 0 days.

(21) Appl. No.: 14/419,698

(22) PCT Filed: Aug. 5, 2013

(86) PCT No.: PCT/IL2013/050663
§ 371 (c)(1),
(2) Date: Feb. 5, 2015

(87) PCT Pub. No.: WO2014/027342
PCT Pub. Date: Feb. 20, 2014

(65) Prior Publication Data
US 2015/0211831 A1    Jul. 30, 2015

(30) Foreign Application Priority Data

Aug. 13, 2012    (IL) .......................................... 221439

(51) Int. Cl.
*F41H 11/02*    (2006.01)
*F41J 2/02*    (2006.01)
(Continued)

(52) U.S. Cl.
CPC ................ *F41H 11/02* (2013.01); *F41A 33/00* (2013.01); *F41F 3/04* (2013.01); *F41F 3/0406* (2013.01);
(Continued)

(58) Field of Classification Search
CPC ..................................................... F41H 11/02
USPC .............................................. 434/14; 89/1.11
See application file for complete search history.

(56) References Cited

U.S. PATENT DOCUMENTS

| 4,959,015 A | 9/1990 | Rasinski et al. |
| 5,421,728 A | 6/1995 | Milden |

(Continued)

FOREIGN PATENT DOCUMENTS

| CA | 2573421 A1 | 7/2007 |
| EP | 2224260 B1 | 5/2012 |
| GB | 2400644 A | 10/2004 |

OTHER PUBLICATIONS

Clements, Jim et al., "Missile Airframe Simulation Testbed—MANPADS (MAST-M) for Test and Evaluation of Aircraft Survivability Equipment", (2011), Proc. of SPIE, vol. 8015, pp. 80150A-1-80150A-7 (May 13, 2011), doi:10.1117/12.884656.
(Continued)

*Primary Examiner* — Reginald Tillman, Jr.
(74) *Attorney, Agent, or Firm* — Harness, Dickey & Pierce, P.L.C.

(57) ABSTRACT

A system for evaluating aircraft/watercraft/battle-vehicle survivability equipment comprising: (1) a Static Pyrotechnic Unit (SPTU) and a support stand; (2) a system of Short Range Simulating Rocket (SRSR) and a rocket launching apparatus; and (3) a control system that activates said Static Pyrotechnic Unit in (1) and said system SRSR in (2). When the Static pyrotechnic Unit is ignited, the resulting flash has an IR wavelength and multi spectral emission, intensity and time duration that simulate the initial flash created by a shoulder missile. When the Short Range Simulating Rocket is fired, the resulting radiation has an IR wavelength and multi spectral emission, intensity and time duration that simulates the radiation trail emitted from a fired shoulder missile. The flash created by the Static pyrotechnic Unit, and the trail emission of the Short Range Simulating Rocket are detected by the target survivability detection equipment, enabling the target to take protective measures.

14 Claims, 5 Drawing Sheets

(51) Int. Cl.
*G09B 9/08* (2006.01)
*G09B 19/00* (2006.01)
*F41A 33/00* (2006.01)
*F41F 3/04* (2006.01)
*F41G 7/00* (2006.01)

(52) U.S. Cl.
CPC .............. *F41G 7/002* (2013.01); *F41G 7/006* (2013.01); *F41J 2/02* (2013.01); *G09B 9/08* (2013.01); *G09B 19/00* (2013.01)

(56) References Cited

U.S. PATENT DOCUMENTS

| | | | |
|---|---|---|---|
| 5,549,477 | A | 8/1996 | Tran et al. |
| 5,693,951 | A | 12/1997 | Strong, III |
| 5,787,333 | A | 7/1998 | Rasinski et al. |
| 7,437,245 | B2 | 10/2008 | Ybarra et al. |
| 7,565,858 | B2 | 7/2009 | Boyd et al. |

OTHER PUBLICATIONS

Cabib, Dario et al., "Missile warning and countermeasure systems in-flight testing, by threat simulation and countermeasure analysis in the field", Infrared Technology and Applications XXXII, Proc. of SPIE, vol. 6206, 62061Y-1-62061Y-11, (2006).

Dron, Alan, "U.S. Receives New Surface-to-Air Missile Simulators from U.K. Firm", Defense News, Feb. 3, 2012.

Staff Writers, "US Army Selects AAI's Man-Portable Aircraft Survivability Trainer", Space Daily, Hunt Valley, MD (SPX) Apr. 6, 2011.

MANPADS Integrated T Leaders in providing decision-quality data, Dec. 2010, NAVAIR Public Release #10-1461, Approved for public release, distribution unlimited.

International Preliminary Report on Patentability, International Application No. PCT/IL2013/050663, dated Feb. 17, 2015, 6 pages.

THREAT SIMULATING SYSTEM

CROSS-REFERENCE TO RELATED APPLICATIONS

The present application is a 371 U.S. National Stage Application of International Application No. PCT/IL2013/050663, filed on Aug. 5, 2013, which claims priority to Israeli Patent Application No. 221439, filed on Aug. 13, 2012. The entire disclosures of the above-referenced applications are incorporated herein by reference.

FIELD OF THE INVENTION

The present invention relates generally to aircrafts survivability testing. More particularly, the present invention relates to an apparatus, a method and system for simulating a shoulder launched missile or similar weapon systems.

BACKGROUND OF THE INVENTION

Military aircrafts including helicopters such as attack helicopters-AH and utility helicopters-UH) that operate under hostile conditions, as well as civil aircrafts are susceptible to encountering enemy actions intended to destroy the aircrafts. Such actions may be from ground based weapons, such as anti-aircraft fire, ground-to-air missiles or fighter aircraft carrying air-to-air missiles. To combat enemy tactics, the attacked aircraft may resort to electronic countermeasures, such as jamming tracking radar and missile emissions, deceptive measures such as flares to deflect infra-red missiles or chaff to confuse radar, and evasive maneuvers.

The defense system, i.e., threat warning and countermeasures system, needs to be tested in real time. The effectiveness and quality of the defense system depend on the ability and training of the pilot and aircrew to operate effectively the systems in real time. Various techniques are available to evaluate the performance of aircraft survivability systems, some of which are described below:

U.S. Pat. No. 4,959,015 Describes an interactive tester for electronic countermeasures simulation capable of providing displays of in-flight threats and countermeasures responses representative of an actual combat equipment suite. Threat scenarios are stored in computer memory and recalled at a push-button display console. The aircraft position with respect to selected threats is displayed in real time superposed on the threat parameters. Displays are identical to that provided by the equipment simulated and reflect the true operational status as preset by the operator.

U.S. Pat. No. 5,421,728 describes a system for performing in-flight, real-time Radar Warning Receiver (RWR) testing which optionally merges real and simulated threat indications. The system is self-contained, and no modifications are required to external equipment to support it. The system merges real threat reports with simulated threat reports to create comprehensive and realistic threat scenarios and audio/voice indications.

U.S. Pat. No. 5,549,477 discloses an in-flight simulator for an integrated aircraft survivability equipment system controlling radar warning receiver and a radar jammer with countermeasures control that provides a testing module which emulates the existence of airborne threats. The airborne threats are provided in real time as if they were detected by a threat detection system such as a warning radar receiver or a radar jammer.

Cabib et al., "Missile Warning and Countermeasure Systems in-flight testing by threat simulation and countermeasure analysis in the field", Proc. SPIE 620662061Y (2006) developed a unique integrated Missile Warning Systems (MWS)/countermeasure test system for field use. The system is composed of: i) high intensity dynamic Infrared Threat Stimulator (IRTS), based on large optics and high speed shutter for time dependent scenario construction and projection to several kilometers, and ii) sensitive IR Jam Beam Radiometer (JBR) for countermeasure testing. The IRTS/JBR system tests the countermeasure efficiency range, probability of detection, reaction time, and overall well functioning.

Jim Clements et al., US Army Aviation & Missile Research Development & Engineering Center, Redstone Arsenal, "Missile Airframe, Simulation Test-bed—Man-Portable Air Defense Systems (MANPADS) for Test and Evaluation of Aircraft Survivability Equipment", Proc. of SPIE, Vol. 8015 80150A-1 describe a recoverable surrogate MANPADS missile system capable of engaging aircraft equipped with Aircraft Survivability Equipment (ASE) while guaranteeing collision avoidance with the test aircraft. The surrogate missile system utilizes actual threat MANPADS seeker/guidance sections to control the flight of a surrogate missile which will perform a collision avoidance and recovery maneuver prior to intercept to insure non-destructive test and evaluation of the ASE.

Thus, there are numerous techniques to evaluate the performance of aircraft survivability equipment against threats. These techniques include laboratory testing with simulated aircraft and simulated missile signatures which lack the realism of evaluating aircraft survivability equipment, and techniques that involve flying actual non-destructive missiles against aircraft which are quite expensive, and therefore, limit the number of tests to a fraction of the desired tests.

It is an aim of the present invention to provide a highly reliable, user-friendly system and method for evaluating the performance of aircraft survivability equipment in real time and real scenario process. The system and method are cost effective so that the cost will not be a factor limiting the number of tests.

BRIEF SUMMARY OF THE INVENTION

The present invention describes a Threat Simulating System (TSS) that simulates shoulder launched missiles which uses low cost rockets to simulate and test aircraft protection and survivability systems. The current TSS simulates all parameters used today in modern state-of-the-art protection systems used in helicopters, aircraft and armored vehicles. Particularly, the TSS simulates a threat coming from shoulder launched missiles such as, for instance (IR) thermal missile, laser missile or radio frequency (RF) missile. The TSS uses static pyrotechnical system and low cost rockets to simulate the firing of a shoulder missile, including the following effects in time durations that are comparable to those of the original shoulder missile: ejection, motion (acceleration, speed), high intensity dynamic Infrared (IR) emission, visible (fire and smoke), ultra violet (UV) emission, noise.

Thus, in accordance with some embodiments of the present invention, there is provided a system for evaluating aircraft/watercraft/battle-vehicle survivability equipment comprising the following:

(1) a Static Pyrotechnic Unit (SPTU) and a support stand on which the Static pyrotechnic Unit is positioned, the support stand comprising a base and insulating board connected by a telescopic pole, the insulating board has wires for igniting the SPTU, and the SPTU is coated with a flammable material/compound for electrical ignition;

(2) a system of Short Range Simulating Rocket (SRSR) and a rocket launching apparatus, the Short Range Simulating Rocket comprising a front section which comprises a pyrotechnic flare material, a back section which comprises a propellant, a rocket engine, and stabilizing fins, and in between the front section and the back section, there is a safety mechanism that enables/disables the activation of the SRSR, said launching apparatus comprising a tripod that can change azimuth and elevation and pedestal on top of which a launch tube is mounted; and (3) a control system that sets the timing of and activates said Static Pyrotechnic Unit in (1) and said system in (2), wherein, when the Static pyrotechnic Unit is ignited, the resulting flash is characterized by having an IR wavelength and multi spectral emission, intensity and time duration that simulates the initial flash created by a fired shoulder missile, wherein, when the Short Range Simulating Rocket is fired, the resulting radiation is characterized by having an IR wavelength and multi spectral emission, intensity and time duration that simulates the radiation trail emitted from a fired shoulder missile;

wherein, the flash created by the Static pyrotechnic Unit, and the trail emission of the Short Range Simulating Rocket are detected by the target (aircraft/watercraft/battle-vehicle) survivability detection equipment and their trajectory and emission characteristics are determined, enabling the target to take protective measures.

Furthermore, according to embodiments of the present invention, the Static pyrotechnic Unit comprises an electrical ignition system.

Furthermore, according to embodiments of the present invention, the flammable material/compound comprises Magnesium, Teflon, and Viton or a combination thereof.

Furthermore, according to embodiments of the present invention, the coating material/compound having a thickness of up to 1.5 mm determines the flash duration of the Static pyrotechnic Unit.

Furthermore, according to embodiments of the present invention, the surface area of the Static pyrotechnic Unit comprises ribs or fins.

Furthermore, according to embodiments of the present invention, the surface area, of the Static pyrotechnic Unit determines the intensity of the flash.

Furthermore, according to embodiments of the present invention, the length of the Static pyrotechnic Unit determines the intensity of the flash.

Furthermore, according to embodiments of the present invention, the shape of the Static pyrotechnic Unit determines the intensity of the flash.

Furthermore, according to embodiments of the present invention, the insulating board is made from silica.

Furthermore, according to embodiments of the present invention, the telescopic pole is made from metal.

Furthermore, according to embodiments of the present invention, the pyrotechnic material of the Short Range Simulating Rocket has a ribbed structure.

Furthermore, according to embodiments of the present invention, the pyrotechnic material of the Short Range Simulating Rocket comprises a (pellet) flare assembly.

Furthermore, according to embodiments of the present invention, the Short Range Simulating Rocket is programmed to follow a ballistic trajectory based on preset direction, range, height, acceleration and speed for maximum safety.

Furthermore, according to embodiments of the present invention,

There is provided a method for evaluating aircraft/watercraft/battle-vehicle survivability equipment comprising:
providing the system described above;
determining the distance/range of the aircraft/watercraft/battle-vehicle being tested to assure that it is in the safe range for the test;
igniting the Static pyrotechnic Unit; and
activating and launching the Short Range Simulating Rocket to test the aircraft/watercraft/battle-vehicle being tested within a predetermined time.

DETAILED DESCRIPTION OF THE DRAWINGS

Figure 1:
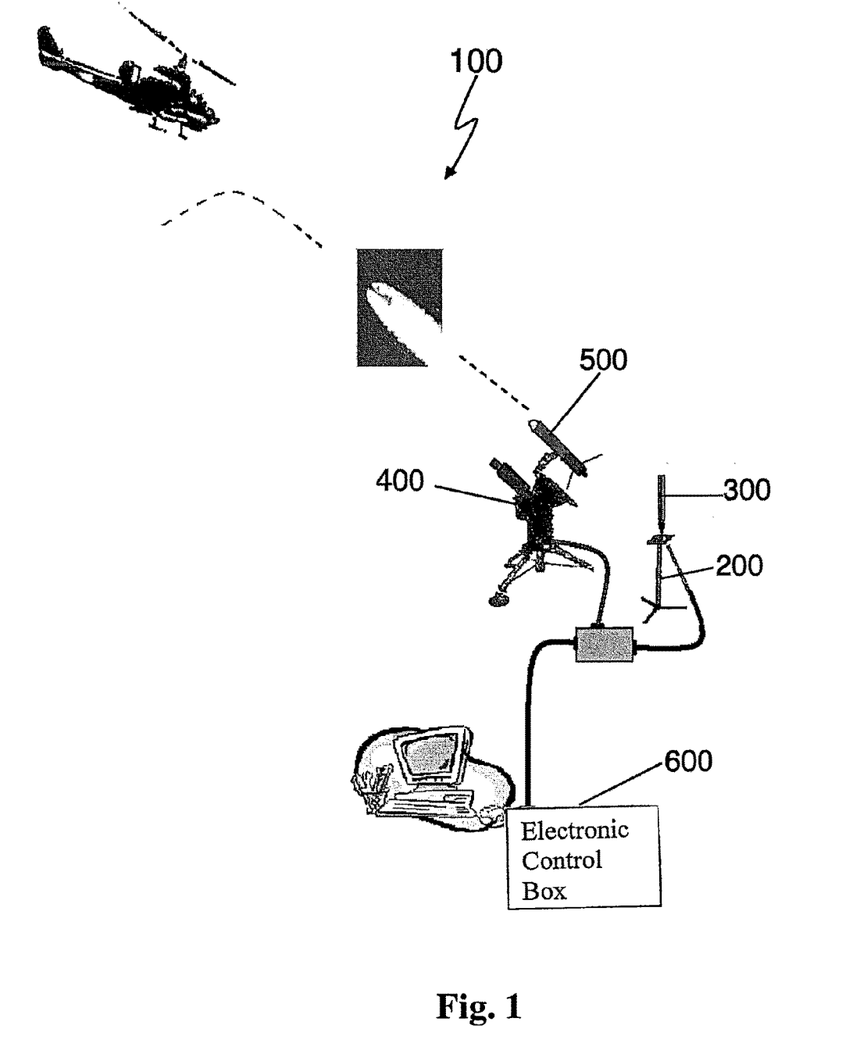
FIG. 1 is an overview of the threat simulating system (TSS) in accordance with the present invention.

Referring now to FIG. 1, there is shown a TSS 100 in accordance with this invention. The system is composed of the following units:
a. Support stand 200 that supports a Static Pyrotechnic Unit (SPTU) 300;
b. Rocket launching apparatus 400 with Short Range Simulating Rocket (SRSR) 500 positioned near the SPTU; and
c Electronic control system 600.

Figure 2:
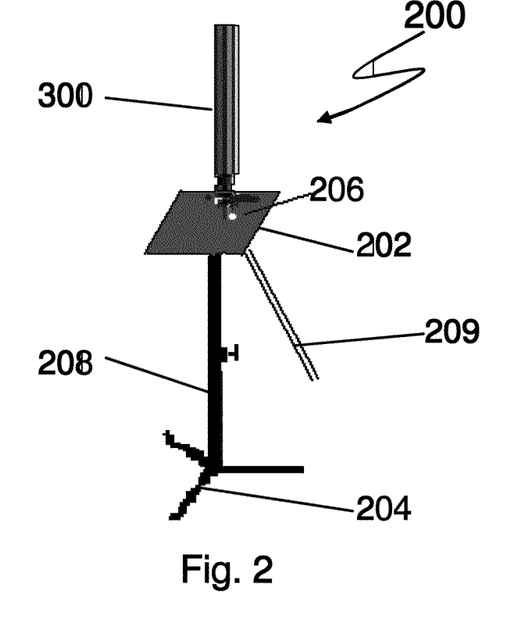
FIG. 2 is an enlarged view of a supporting stand and a static pyrotechnic unit (SPTU) showed in FIG. 1.
Figure 3:
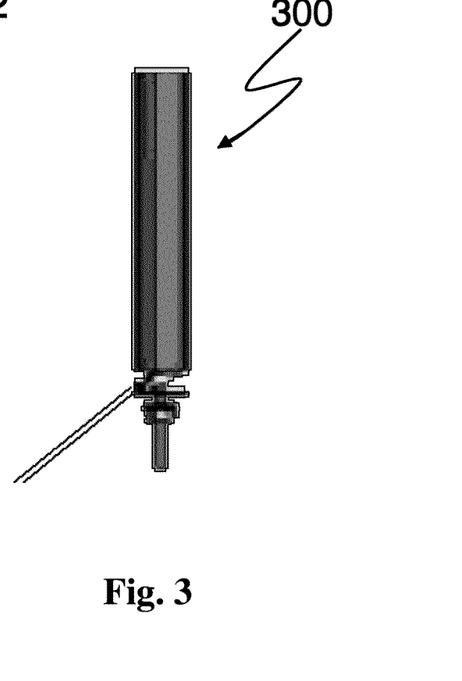
FIG. 3 is an enlarged view of a pyrotechnic unit of FIG. 2.

Referring to FIGS. 2 and 3, there is shown in more detail the support stand 200 and a static pyrotechnic unit (SPTU) 300 positioned near a rocket launching apparatus 400 (See FIG. 1). Support stand 200 comprises a stand 202 on which is placed SPTU 300 coated with a flammable material/compound for electrical ignition. The stand 202 comprises a base 204 and insulating board 206 connected by a telescopic pole 208. The insulating board 206 has wires 209, connected to the electronic control box 600 (FIG. 1) for igniting the SPTU 300. Insulating board 206 is preferably, but not necessarily, made from silica, and the telescopic pole 208 is preferably, but not necessarily, made of metal such as, for instance, aluminum. The SPTU 300 (FIG. 3) is coated with a flammable material/compound for electrical ignition; it is designed to simulate the initial IR emission of the ejection of a real fired rocket such as shoulder launched missile. This is accomplished by using a SPTU 300 made of Magnesium, Teflon, and Viton (MTV).

When the SPTU 300 is ignited, it produces a flash, characterized by a wavelength, intensity and time duration that simulates the initial flash created by the ejection of a shoulder launched missile, such as, for instance, the SA7 or SA18 type shoulder launched missiles.

The SPTU 300 has the following characteristics:
1. It simulates the emission of thermal, IR, or UV missiles and visible light resulting from the flash of the fired missile.
2. It produces IR radiation with a wide range of properties such as power, intensity, and duration that enable replicating all shoulder launched missiles. The IR radiation ranges between 3.75 and 4.85 microns and other IR spectrum.

The physical parameters of SPTU 300, such as the thickness of the coating flammable material/compound, that may be up to 1.5 mm, and/or the length and shape of the SPTU 300 should be optimized. The thickness of the coating material/compound determines the flash duration while the surface area, length and shape of the SPTU 300 determine the intensity of the flash. Thus, for instance, the flash intensity of a smooth cylindrical SPTU may be lower than that of a structure whose surface area is not smooth but rather contains ribs or fins.

Figure 4:
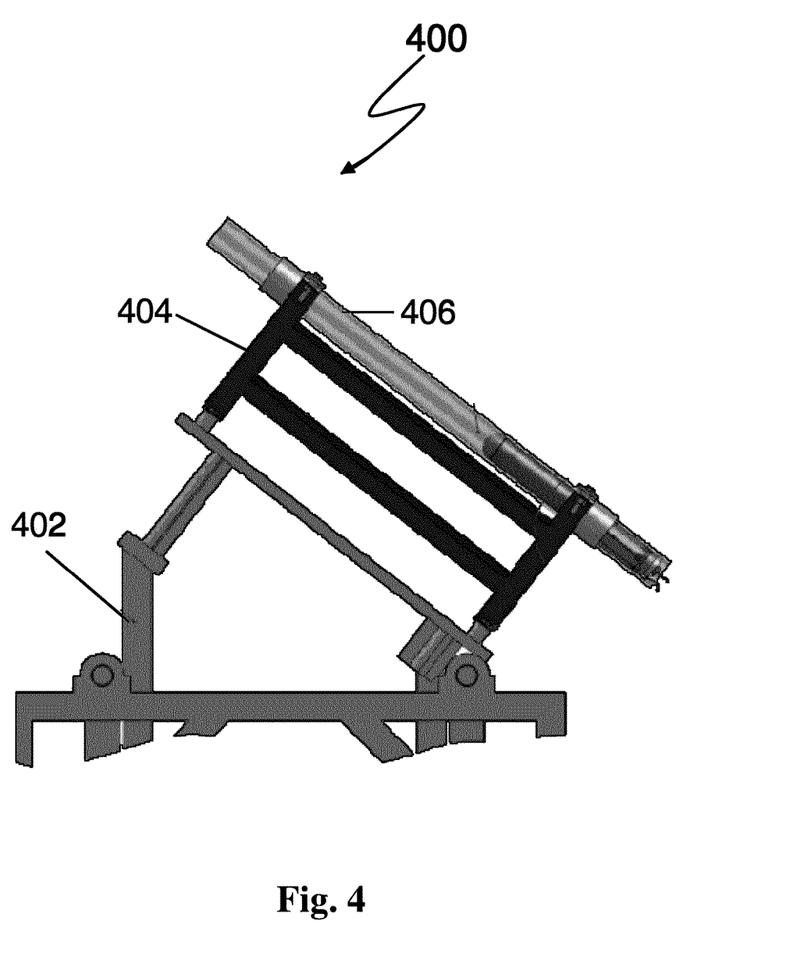
FIG. 4 is an enlarged view of a rocket launching apparatus shown in FIG. 1.

FIG. 4 shows a rocket launching apparatus 400 comprising a tripod 402 that can change azimuth and elevation and pedestal 404 on top of which launch tube 406 is mounted. The rocket launching apparatus 400 is connected to and controlled by the electronic control system 600 which receives data including the range, altitude and direction of the training aircraft, and when proper safety conditions exist, the electronic control system 600 ignites the SPTU 300, and fires the SRSR 500.

Figure 5:
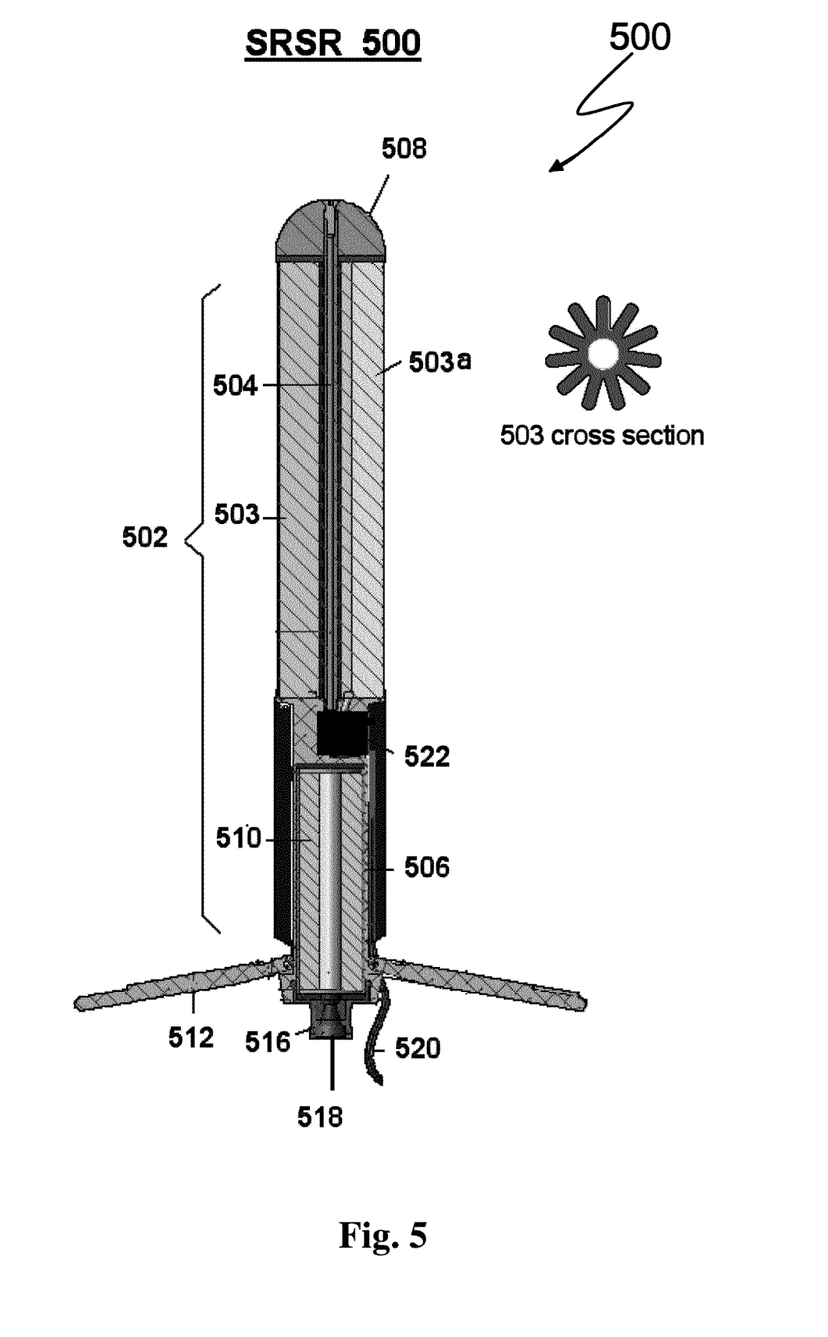
FIG. 5 is a cross sectional enlarged side view of a Short Range Simulating Rocket (SRSR) shown in FIG. 1, in accordance with the present invention.

FIG. 5 is a detailed cross-sectional side-view of a SRSR 500 in accordance with the present invention. The SRSR 500 has a housing 502 which maintains the integrity of the SRSR 500. In order to minimize the size of the SRSR 500, pyrotechnic flare material 503a is contained in the front section 503. This section 503 is terminated with a nose cone 508. Behind the front section 503 there is a back section containing a propellant 510, a rocket engine 506, and stabilizing fins 512 near the end of the housing 502. A rocket engine electric igniter 518, safety unit electric igniter 520, and safety mechanism 522 are positioned between the front section 503 and the back section.

The nose cone 508 provides good aerodynamic flow and simulates the action of actual surface to air shoulder missiles, and also protects the pyrotechnical load 503a which generally includes a (pellet) flare assembly.

The pyrotechnical load can be any one of the following type of loads:
1. Electromagnetic radiation emitting of the structure with inert load.
2. Radio frequency (RF) reflector emitting load.
3. Radio frequency (RF) transmitting load.
4. Chaff types loads.

It should be noted that the dimensions of propellant 510 sets the flight profile of the rocket, or more specifically, the range, height and the speed of flight.

The stabilizing fins 512 are aerodynamic stabilizers that preserve flight stability and launch direction of the rocket.

The safety mechanism 522 is a security measure which ensures that the load will ignite outside of the launching barrel, at the desired time, based on the flight profile and the kind of load used. The safety mechanism 522 controls, enables/disables, the activation of the flare on the SRSR 500. More specifically, the safety mechanism 522 is in its 'pushed in' (disabled) position when SRSR 500 is in its launching barrel, and is in its 'pulled out' (enabled) position when SRTR 500 is out of its launching barrel.

Rocket motor 506 is comprised of an electric igniter 518 that ignites the rocket motor.

In accordance with the present invention, the flight range of SRSR 500 is set by the size of its rocket motor, the weight of the front load, and by the launching angle, which is basically set by the launcher 400. In order not to endanger the person operating the launcher and the platform being tested, SRSR 500 has a relatively small rocket motor that provides a limited ballistic path. In addition, the SRSR 500 will perform a constant ballistic trajectory based on direction, short range, low height, acceleration and speed pre-determined and pre-set for the purpose of obtaining maximum safety.

The following parameters are set in TSS 100 based on the characteristics of the simulated missile:
1. Rocket's ballistic orbit and the flight data determined by the size of the rocket motor and by the launching angle.
2. Radiance frequency of the flare (UV, IR) or loads of RF, laser (etc.).
3. Timing, duration, and intensity of the radiation of the flare, or loads of RF, laser. The electric control box 600 sets the timing of all components of the TSS 100. It first activates the SPTU 300, and then the ignition of the safety mechanism 522 of the flare and rocket motor of the SRSR 500 with a pre-set time difference of fractions in a part of second.

The SPTU 300 may have an IR multi spectral emission, such as, for instance MTV, which is ignited by an electrical squib and simulates the emission of the rocket motor ejecting engine of a shoulder missile by creating a flash, having a wavelength that substantially matches the wavelength of the flash created by the emission of a fired ejecting shoulder missile.

In addition, the dimensions of propellant 503 set the flight profile of the SRTR 500, or more specifically, the short range, low height and the speed of flight. Stabilizing fins 512 are aerodynamic stabilizers that preserve flight stability and launch direction of the rocket.

Safety mechanism 522 is a security measure that insures that the load (flare) ignites outside the launching barrel at the desired time based on the flight profile and the kind of load used.

First electric igniter 520 ignites the capsule in the safety mechanism 522 part of the security and safety unit.

Second electric igniter 518 ignites the rocket engine.

The load pyrotechnic flare material 503 of the SRSR 500 may have an IR multi spectral emission, such as, for instance, MTV, which is ignited by an electrical squib and simulates the emission of the main rocket motor for acceleration and cruising of a shoulder missile, having a wavelength that substantially matches the wavelength of the created by the emission of a fired shoulder missile.

Figure 6:
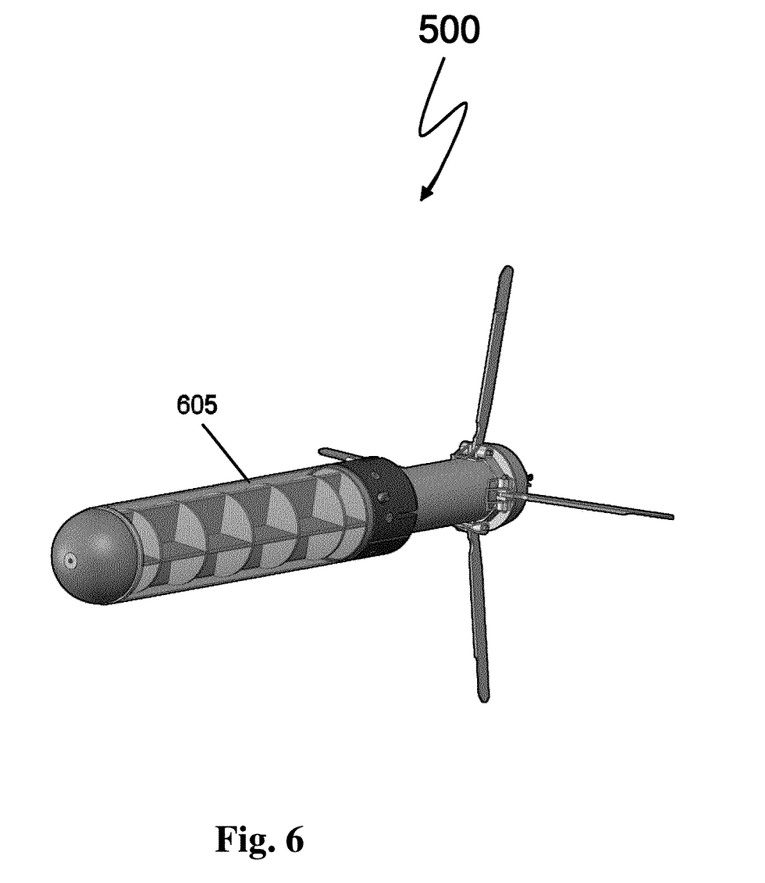
FIG. 6 depicts the interior construction of section of the SRSR of FIG. 5.

When the SRSR 500 is fired, it emits radiation like a rocket's motor of shoulder missile fired. The radiation initiates as soon as the SRSR 500 is launched. The flare radiation intensity is strong enough to compensation the losses of dynamic movement of the SRSR 500 in approach to the training platform (aircraft, helicopter, etc). To increase the intensity of the radiation, the pyrotechnic material 503, i.e., the flare, includes a ribbed structure 605 as seen in FIG. 6 that provides an increased surface area, and thus, a more intense radiation.

Operating Procedure:

Testing the survivability of battle vehicles such as an aircraft with a TSS 100 against a threat of ground to air shoulder missiles or short range missiles comprises the following stages:
1. Providing a system (TSS) 100 in accordance with the invention.
2. Determining the distance/range of the battle vehicle (aircraft) whose survivability systems are being tested to assure that it is in the safe range for the test.
3. Activating the system TSS 100 to do the following:
    a. Ignite a SPTU 300.
    b. Activate and launch the SRSR 500 towards the battle-vehicle (aircraft) being tested within a preset time.

Once the SRSR 500 leaves the launcher 400, the (pyrotechnic) flare load provides IR radiation in the range of suitable wavelengths, required intensity and power, and for a suitable time duration.

It should be noted that the detection system in the aircraft is capable of determining the wavelength of the flash created by SPTU 300 as well as the trail created by the emission of the ejecting rocket motor. The detection system is capable of computing the length of time from the point at which the SPTU 300 flashes till the actual hit of the rocket.

The invention claimed is:

1. A system for evaluating aircraft/watercraft/battle-vehicle survivability equipment comprising the following:
   (1) a Static Pyrotechnic Unit (SPTU) and a support stand on which said Static pyrotechnic Unit is positioned, said support stand comprising a base and insulating board connected by a telescopic pole, said insulating board has wires for igniting the SPTU, and said SPTU is coated with a flammable material/compound for electrical ignition;
   (2) a system of Short Range Simulating Rocket (SRSR) and a rocket launching apparatus, said Short Range Simulating Rocket comprising a front section which comprises a pyrotechnic flare material, a back section which comprises a propellant, a rocket engine, and stabilizing fins, and in between the front section and the back section, there is a safety mechanism that enables/disables the activation of the SRSR, said launching apparatus comprising a tripod that can change azimuth and elevation and pedestal on top of which a launch tube is mounted; and
   (3) a control system that sets the timing of and activates said Static Pyrotechnic Unit in (1) and said system SRSR in (2),
   wherein, when the Static pyrotechnic Unit is ignited, the resulting flash is characterized by having an IR wavelength and multi spectral emission, intensity and time duration that simulates the initial flash created by a fired shoulder missile,
   wherein, when the Short Range Simulating Rocket is fired, the resulting radiation is characterized by having an IR wavelength and multi spectral emission, intensity and time duration that simulates the radiation trail emitted from a fired shoulder missile;
   wherein, the flash created by the Static pyrotechnic Unit, and the trail emission of the Short Range Simulating Rocket are detected by the target (aircraft/watercraft/battle-vehicle) survivability detection equipment and their trajectory and emission characteristics are determined, enabling the target to take protective measures.

2. The system in accordance with claim 1, wherein the Static pyrotechnic Unit comprises an electrical ignition system.

3. The system in accordance with claim 1, wherein said flammable material/compound comprises Magnesium, Teflon, and Viton or a combination thereof.

4. The system in accordance with claim 1, wherein the coating material/compound having a thickness of up to 1.5 mm determines the flash duration of the Static pyrotechnic Unit.

5. The system in accordance with claim 1, wherein the surface area of the Static pyrotechnic Unit comprises ribs or fins.

6. The system in accordance with claim 1, wherein the surface area, of the Static pyrotechnic Unit determines the intensity of the flash.

7. The system in accordance with claim 1, wherein the length of the Static pyrotechnic Unit determines the intensity of the flash.

8. The system in accordance with claim 1, wherein the shape of the Static pyrotechnic Unit determines the intensity of the flash.

9. The system in accordance with claim 1, wherein said insulating board is made from silica.

10. The system in accordance with claim 1, wherein said telescopic pole is made from metal.

11. The system in accordance with claim 1, wherein the pyrotechnic material of the Short Range Simulating Rocket has a ribbed structure.

12. The system in accordance with claim 1, wherein the pyrotechnic material of the Short Range Simulating Rocket comprises a (pellet) flare assembly.

13. The system in accordance with claim 1, wherein the Short Range Simulating Rocket is programmed to follow a ballistic trajectory based on preset direction, range, height, acceleration and speed for maximum safety.

14. A method for evaluating aircraft/watercraft/battle-vehicle survivability equipment comprising:
   providing the system of claim 1;
   determining the distance/range of the aircraft/watercraft/battle-vehicle being tested to assure that it is in the safe range for the test;
   igniting the Static pyrotechnic Unit; and
   activating and launching the Short Range Simulating Rocket to test the aircraft/watercraft/battle-vehicle being tested within a predetermined time.

* * * * *